United States Patent [19]

Spaltofski

[11] Patent Number: 5,123,625
[45] Date of Patent: Jun. 23, 1992

[54] RESILIENT SUPPORT ELEMENT WITH GRADED STIFFNESSES

[75] Inventor: Ralf Spaltofski, Ludwigshafen, Fed. Rep. of Germany

[73] Assignee: Paulstra G.m.b.H., Fed. Rep. of Germany

[21] Appl. No.: 617,816

[22] Filed: Nov. 26, 1990

[30] Foreign Application Priority Data

Nov. 24, 1989 [FR] France ............... 89 15495

[51] Int. Cl.⁵ ................................. F16F 1/00
[52] U.S. Cl. ....................... 248/634; 267/153
[58] Field of Search ........... 248/634, 613, 615, 622, 248/632, 633, 635, 638, 188.9, 345.1, 636; 267/141, 152, 153

[56] References Cited

U.S. PATENT DOCUMENTS

| | | | |
|---|---|---|---|
| 2,147,660 | 2/1939 | Loewus | 248/635 |
| 3,202,412 | 8/1965 | Trask | 267/153 |
| 3,233,885 | 2/1966 | Propst | 267/153 |
| 3,305,227 | 2/1967 | Henley | 267/153 |
| 3,436,042 | 4/1969 | Van Goubergen | 248/633 |
| 4,396,177 | 8/1983 | Liebl | 248/615 |
| 4,421,290 | 12/1983 | Frank | 248/632 |

FOREIGN PATENT DOCUMENTS

| | | | |
|---|---|---|---|
| 373192 | 7/1939 | Italy | 248/634 |
| 31536 | 3/1981 | Japan | 267/153 |

Primary Examiner—Ramon O. Ramirez
Assistant Examiner—Robert A. Olson
Attorney, Agent, or Firm—Larson & Taylor

[57] ABSTRACT

A resilient material element with graded stiffnesses is disclosed comprising radial substructures carried by the body of the element and separated by radial gaps, these substructures themselves carrying studs of more reduced cross section. When the element is subjected to compression forces in the axial direction, the studs are crushed, then the substructures, which confers on the element sudden increases of stiffness. An additional increase of stiffness is provided when, with the substructures expanded laterally, their facing walls come into mutual abutment, which completely closes the gaps.

13 Claims, 6 Drawing Sheets

RESILIENT SUPPORT ELEMENT WITH GRADED STIFFNESSES

BACKGROUND OF THE INVENTION

The present invention relates to a resilient material element intended to be subjected to compression forces in a given main direction and to be thus flattened between two of its ends, so that, considered in the direction from one at least of these ends inwards, it has at least one sudden increase of cross section, transversely to said main direction, whereby the stiffness of the element may increase in a proportion appreciably greater than the increase of said forces from the moment when the latter reach a given value.

In numerous applications, particularly in resilient material devices providing the suspension for internal combustion engines on the chassis of vehicles, it is necessary to obtain low stiffness (low modulus of elasticity) when the device is subjected to low force stresses, particularly under compression, and an appreciably higher stiffness from the moment when the stresses exceed a given value.

The reason for this requirement is that, for low amplitudes of the forces which are exerted on the device, good damping of the noises and the normal vibrations of the engine require a very low stiffness of the support. On the other hand, this low stiffness would become a hindrance if it existed for very high amplitudes of the compression forces, such as those which may occur when the vehicle passes over a pothole, or other sudden discontinuity of the roadway. In fact, in this case, the resilient support device would no longer fulfil its role as damper and coming into abutment would be fierce.

It is then the need to obtain progressive abutment even when the forces are considerable and sudden, closely related to shocks, which leads to constructing devices whose stiffness increases greatly when the compression forces which are exerted thereon increase.

Devices of this type are already known in which the resilient material element is formed by a rubber or elastomer block comprising cavities on the inside. These cavities confer on the block a relatively low modulus of elasticity for low forces, but the stiffness increases suddenly when, under the action of increasing forces, the block is compressed until the cavities are completely crushed.

SUMMARY OF THE INVENTION

The aim of the present invention is to perfect this type of device so that they have several grades of stiffness and even any number of grades depending on the applications.

For this, a resilient support element according to the invention will be essentially characterized in that it is formed of a central body covered, over at least two of its opposite faces intended to be subjected to compression forces, with a certain number of studs of reduced cross section, projecting from the surface of said body, at least a part of said studs of reduced cross section serving as substructure for external studs having a cross section even more reduced than the preceding ones.

In other words, the resilient material element comprises externally portions of reduced cross section or studs, projecting from a central body of greater cross section: when the compression forces exerted on the element are small, the stiffness of the element remains low, since these forces only cause practically progressive crushing of the studs, which are of course of a low stiffness. On the other hand, when these forces exceed a certain predetermined value, the stiffness of the element increases suddenly from the moment when the studs are almost completely crushed.

Furthermore, it will also be understood that although each stud (or a certain number of them) form the substructure for external studs of even greater cross section, an increase in stiffness over two grades will be obtained: a first sudden increase of stiffness after practically complete crushing of the external studs; a second sudden increase of stiffness after practically complete crushing of the substructure studs, following which it is the stiffness of the body of the element which comes into play to provide the highest stiffnesses and confer on the element an efficient stop function.

If, further, the first studs mentioned serve as substructures, not each (or only a part of them) for a stud of more reduced cross section, but for an arrangement of several studs with more and more reduced cross section, going from the body outwards, it will be readily understood that a body will be obtained with stepped or graded stiffnesses; if F designates the compression forces and D the relative flattening of the element under these forces, the desired form can thus be conferred exactly on the curve $F = f(D)$ by choosing appropriately the form, the number and the cross section of the studs of each stage.

An element according to the invention may then be further characterized in that it is formed of a central body covered, over at least two of its opposite faces intended to be subjected to compression forces, with a certain number of arrangements of studs, whose cross sections are reduced by steps from the body outwards.

The form of the cross section of these studs may of course be extremely varied: circular square, rectangular, triangular, etc. The same stud may also itself have a variable cross section, for example in the form of a cone, pyramid, etc. . . . , all forms and arrangements being theoretically possible.

In according with the invention, additional possibilities may be obtained by forming the element with recesses of dimensions adapted to be reduced under the effect of the compression forces, the mutual contacting of their adjacent walls causing a sudden and additional increase of the stiffness of the element from the moment when said forces reach a given value, greater than that which causes crushing of said studs.

These recesses may be formed by gaps separating at least some of said studs, for example the substructure studs of said arrangements.

In the case of a generally cylindrical shaped body, the gaps may be radial and with constant angular spacing.

Considering that a resilient material element subjected to compression forces on two of its opposite faces tends to expand laterally, the general principle of the invention may use this characteristic so that the element has a further sudden increase of stiffness from the moment when these compression forces exceed a certain threshold. For this it will be sufficient to provide for the lateral surface of the element to bear in a particular way on a lateral holding piece from the moment when the compression forces reach said threshold. This particular bearing relation may be obtained by a special design of the lateral holding piece, or by a special design of the lateral surface of the resilient material element, as will be seen further on.

BRIEF DESCRIPTION OF THE DRAWINGS

Embodiments of the invention will now be described by way of examples which are in no wise limitative, with reference to the figures of the accompanying drawings in which.

Figure 1:
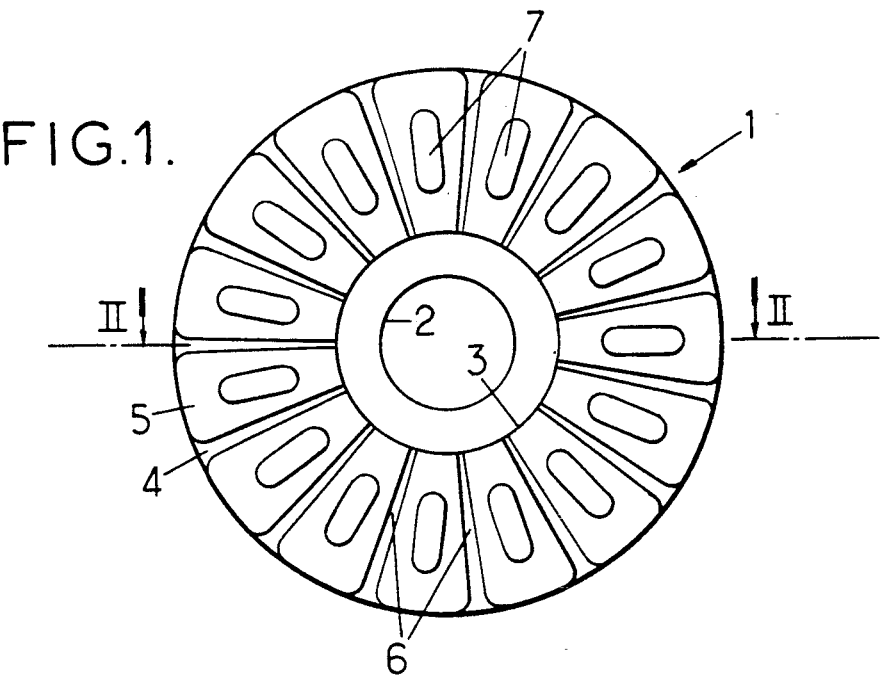
FIG. 1 is a bottom view of a resilient support element according to the invention, whose body has a general cylindrical shape.
Figure 2:
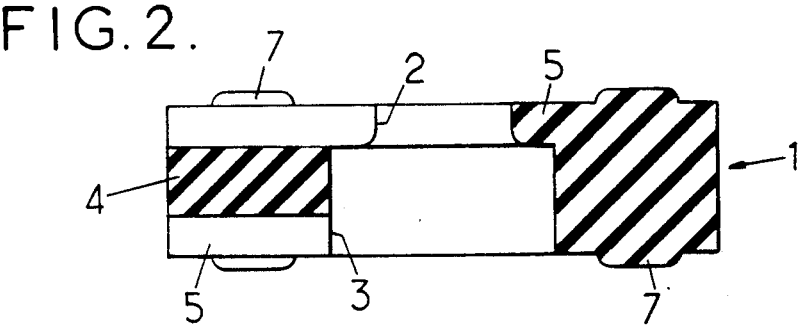
FIG. 2 is a diametrical sectional view through line II—II of FIG. 1.
Figure 3:
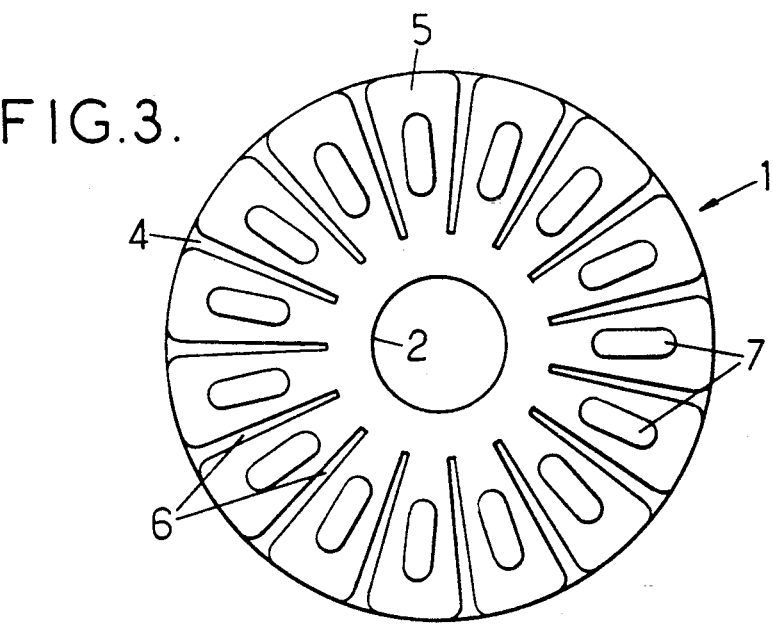
FIG. 3 is a top view of the same element.

In the embodiment of FIGS. 1 to 3, the resilient material element 1 has the general shape of a cylindrical disc formed at its centre with a hole 2 widened at its lower part at 3, the axis of this hole, which serves for fixing the element on a connecting rod to any body, being directed in what was called above "the main direction", namely that of the compression forces which the element is intended to withstand.

Element 1, made in one piece from moulded elastomer, comprises a central body 4 covered, on each of its two opposite faces, with a first series of base studs 5 of reduced cross section, in the form of sectors of a circle with equal angles at the centre and separated equi-angularly by radial gaps 6. Each base stud 5 serves as a substructure for an external stud of appreciably smaller cross section 7.

Figure 4:
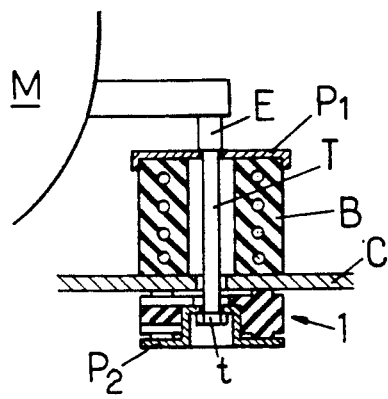
FIG. 4 shows schematically the element incorporated, as traction stop, in the device supporting an internal combustion engine.

FIG. 4 shows how this element 1 may be used for withstanding the compression forces while serving as traction stop, in a vehicle engine suspension system. The engine is shown schematically at M and the chassis of the vehicle at C. Via the shoulder E of a rod T and an abutment plate P1, engine M is supported by an elastomer block B which may be conventional or with internal cavities and which bears on chassis C.

The element 1 according to the invention is compressed between the same chassis C, from underneath, and another abutment plate P2 in the form of a cup, whose bottom is engaged in the widened portion 3 of the hole which passes through the element and is held in position by the head t of rod T. It can be seen that an element 1 thus disposed will limit the upward movements of engine M when a tractive force is exerted on rod T.

For small movements, the crushing of element 1 between chassis C and plate P2 will be limited to crushing of the external studs 7. The stiffness of the element will therefore be very low; this phase may be considered as illustrated by the curved portion 0-M1 on the graph $F=f(D)$ of FIG. 5. For movements which are a little greater, crushing of studs 7 is complete and then progressive crushing of the substructure base studs 5 takes place, which may be considered as illustrated by the curved portion with greater slope M1-M2 in FIG. 5, which shows a considerable increase in stiffness. When the base studs 5 are heavily crushed, the bulging of their lateral walls brings these walls into mutual contact, from which moment (at M2) in the graph, the stiffness further increases to become practically, between M2 and M3, that of the central body 4 of the element. Thus the required stop effect is obtained, but with progressive increase of the stiffness between the lowest stiffness and the highest stiffness.

Figure 5:
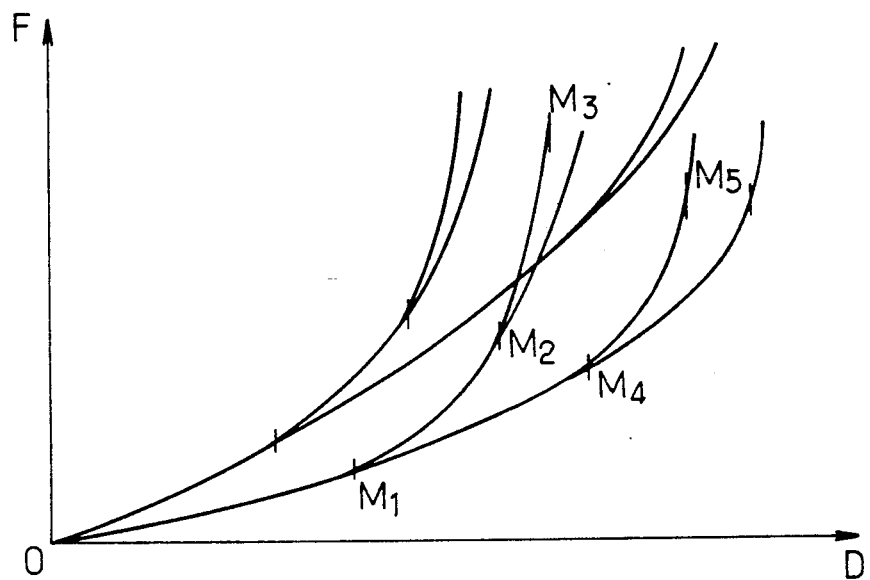
FIG. 5 shows schematically how, with the invention, it is possible to modify the curves $F=f(D)$ of a resilient support element according to the invention.

FIG. 5 shows other possible evolutions of the curve, such as M1-M4-M5, which may be obtained with other configurations or shapes of the studs or of the gaps between studs.

Figure 6:
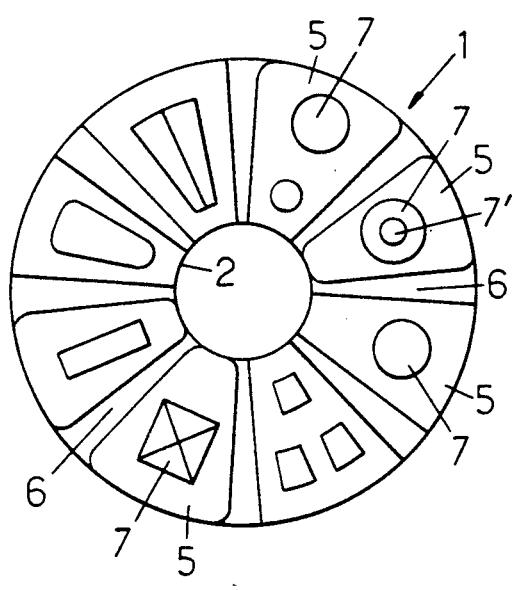
FIGS. 6 and 7 are partial and combined top views showing possible variants of the shape of the resilient support element.
Figure 7:
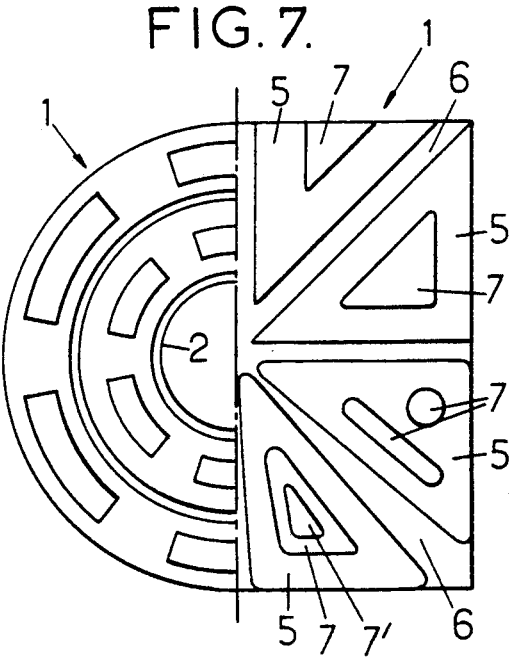

Other forms and configurations are shown in a plan view in FIGS. 6 and 7, with numerical references corresponding to those of FIGS. 1 to 3 to designate the respective similar parts of the elements. It can be seen that some studs 5 may serve as substructures for stud arrangements such as 7, 7', which further improves the curve $F=f(D)$ as required.

Figure 8:
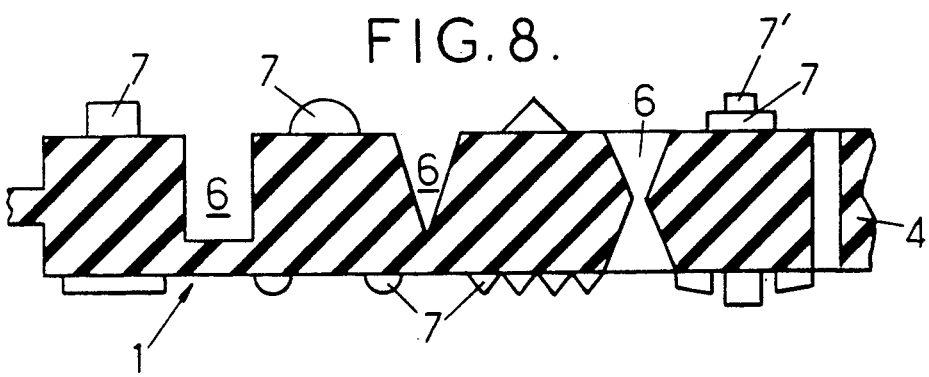
FIGS. 8 to 10 (a and b) are vertical sectional views showing yet other possible shapes of the resilient material elements.
Figure 9:
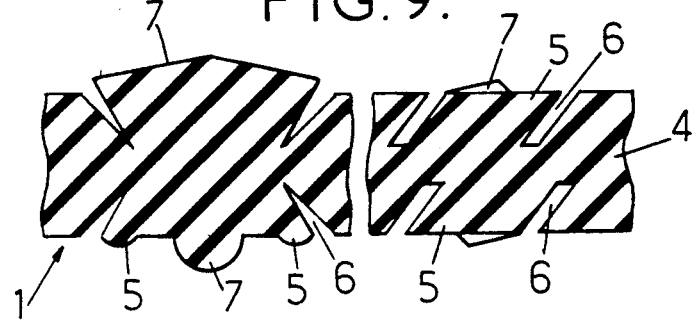
Figure 10A:
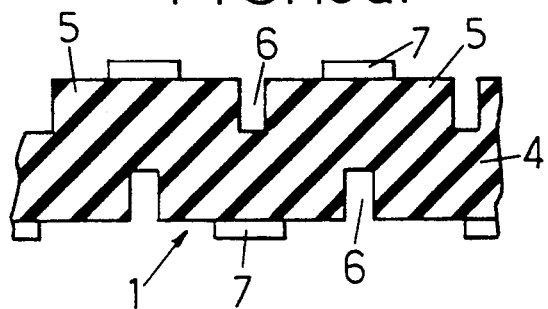
Figure 10B:
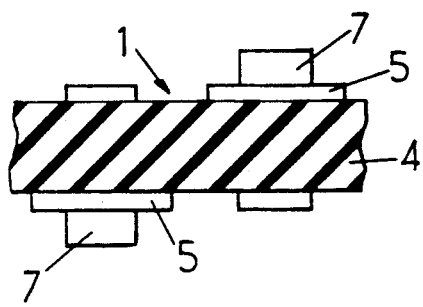

FIGS. 8 to 10 (a and b) show in section some other possible forms of the studs and of the gaps of resilient material elements 1 again according to the invention, the embodiments of FIGS. 10a and 10b having offset structures.

Figure 11:
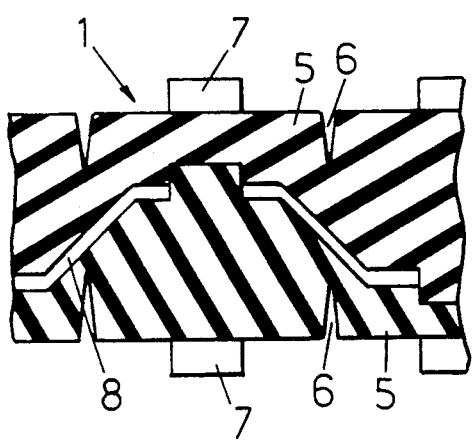
FIGS. 11 and 12 show in vertical section the superpositioning of several resilient material element according to the invention.
Figure 12:
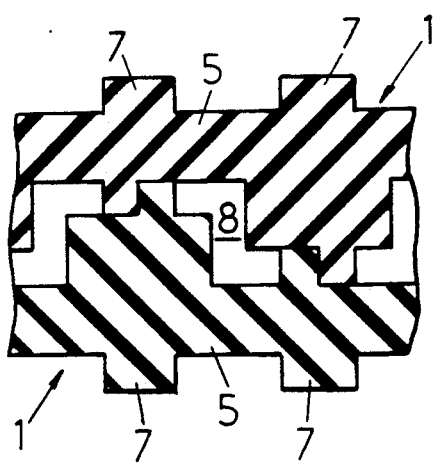

FIGS. 11 and 12 shows other variants, with superimposed structures, for further increasing the number of possibilities as to the shape of curve $F=f(D)$. In these latter embodiments, it can be seen that cavities such as 8 may be further created between two superimposed elements 1, crushing of these cavities causing an additional degree of increase of stiffness.

Figure 13:
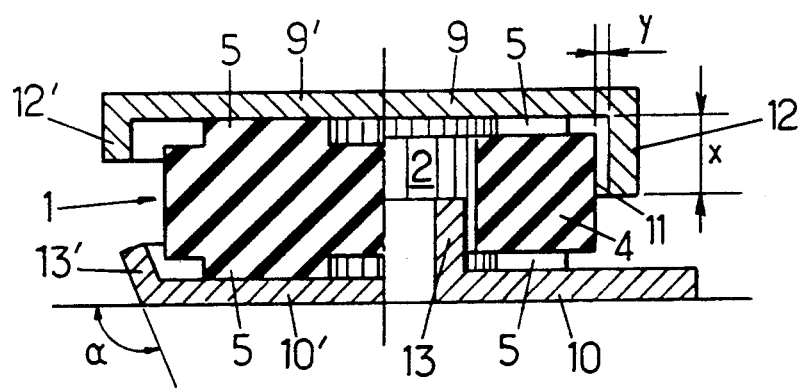
FIG. 13 shows, in two half views in cross section, the principle of a support element according to the invention comprising connecting pieces with lateral flanges adapted to cause a variation of stiffness transversely to the main direction of the compression forces.

In the embodiments of FIG. 13, the possibility has been shown of implementing different ways of providing the lateral supports and their particular shape, for creating the required increases of stiffness from the moment when the compression force reaches a predetermined value. In this figure compression plates 9, 9' and 10, 10' have been shown.

Plate 9 has a fairly large flange 12, for cooperating with the lateral wall 11 of body 4 of the resilient material element 1. By adjusting the height x and gap y, it is possible to determine from which lateral expansion wall 11 will bear on flange 12, and how the stiffness of element 1 can thus be increased.

Plate 10 is a flat plate, but with a tubular section 13 penetrating into the axial hole 2 of body 4 with spacing which here again may result under desired conditions in an increase of the stiffness of element 1.

Plate 9' has a flange 12' smaller than flange 12 and spaced further away from the lateral wall 11 of body 4, which will cause the increase of stiffness to take place later and to a lesser extent than with flange 12.

Finally, plate 10' comprises a splayed flange 13', and it is by adjusting the splaying angle $a$ that the method of increase of the stiffness of element 1 may be controlled.

In the embodiments of FIG. 13, we have then the combination of the increases of the axial stiffness and of the radial stiffness.

Figure 14:
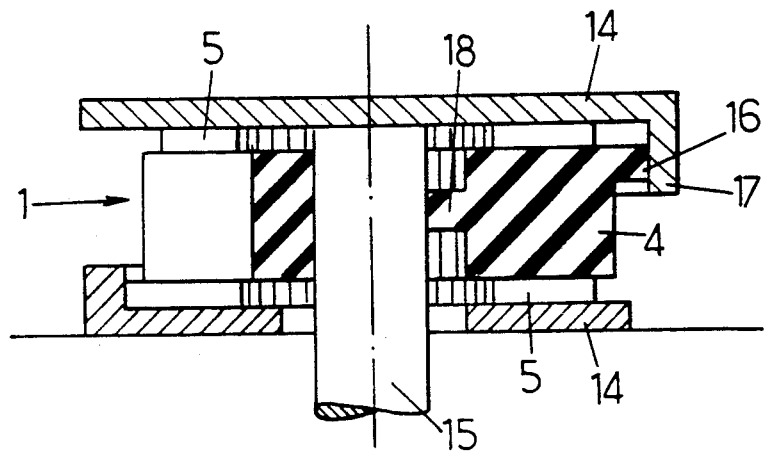
FIG. 14 is a view similar to that of FIG. 13, showing a variant of this principle.
Figure 15:
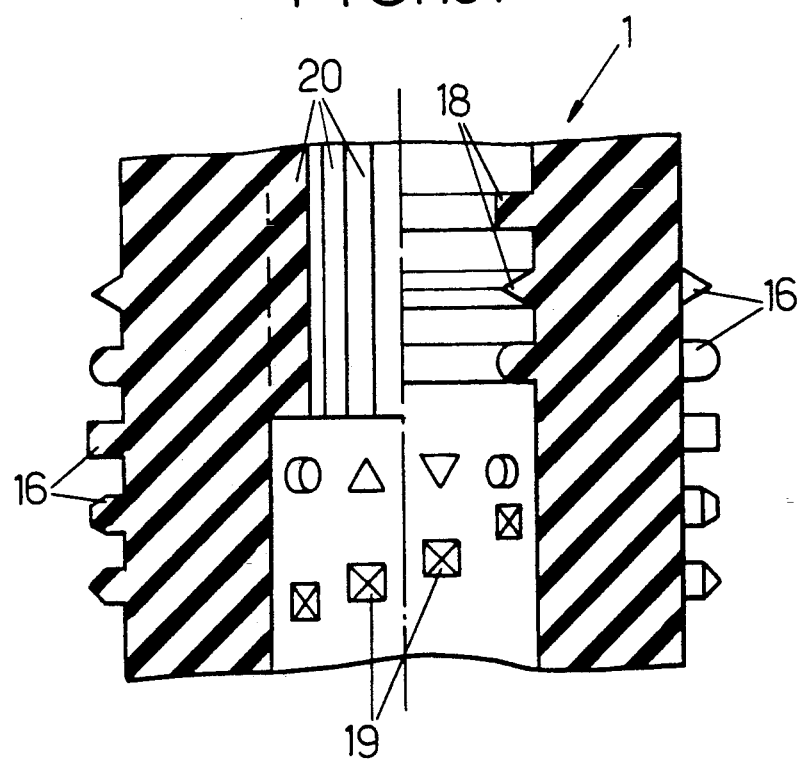
FIG. 15 shows a resilient material element according to the invention, whose lateral internal and external surfaces carry studs or ribs adapted to confer a variation of stiffness on the element transversely to the main direction of the compression forces.

Another variant is shown in FIG. 14, in which the body 4 of the resilient material element 1 is contained between two flanged plates 14 and a central shaft 15 passing completely through the element. The low axial stiffness—for moderate compression forces—is here provided by studs 5 and the low radial stiffness, also for moderate forces, is provided by circular ribs of relatively small thickness, external 16 for cooperating with the flange 17 and internal 18 for cooperating with shaft 15, these two ribs being thus crushed progressively as the axial forces exerted on plates 14 increase FIG. 15 shows different possible shapes of the external and internal ribs of another element 1 according to the invention; studs such as 19, or else longitudinal ribs 20, may also be provided on the inside.

Figure 16:
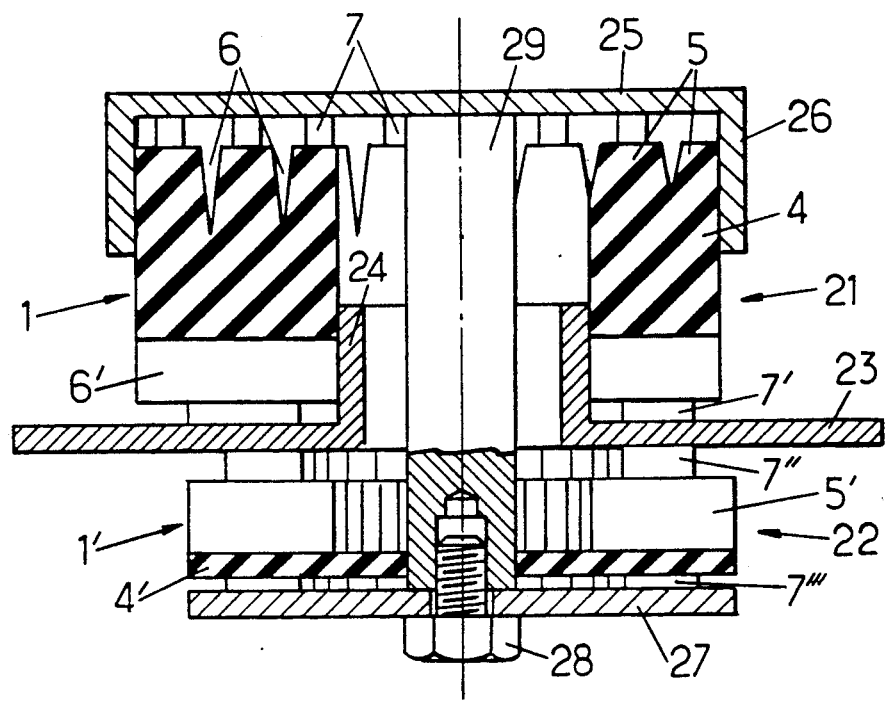
FIG. 16 shows two axial half sections of a resilient support element according to the invention, with its connecting pieces and adapted to form both a compression stop and a traction stop.
Figure 17:
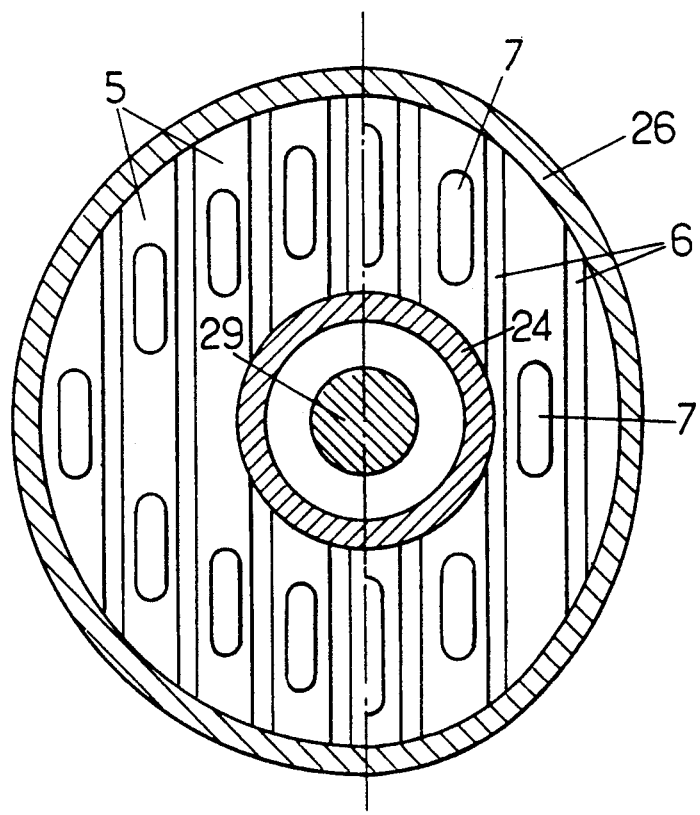
FIG. 17 shows the resilient material element of FIG. 16 seen from the top.

In FIGS. 16 and 17, a complete suspension system has been shown comprising a compression stop and a traction stop 22 with resilient material elements according to the invention.

Element 1 of the compression stop 21 is compressed between a chassis plate 23 with collar 24 and the bottom 25 of a bearing cup with guide and lateral bearing flange 26. It comprises substructure studs 5 separated by triangular section gaps 6 and themselves carrying studs with reduced cross section 7 in abutment on bottom 25. Similarly, it comprises in its lower portion studs of reduced cross section 7' bearing on the chassis plate 23 and carried by substructure studs separated by gaps 6'.

As for element 1' of the traction stop 22, it is compressed from underneath between the chassis plate 23 and another stop plate 27 fixed by a bolt 28 to the lower end of a shaft 29 whose other end is fixed to the bottom 25, for example by welding.

Element 1' similarly comprises studs of small cross section 7'' and 7''' carried by a body 4' with, for studs 7'', the substructure of intermediate studs of greater cross section 5' also separated by gaps, for example radial gaps.

It can however be seen in the upper portion of FIG. 16 and in FIG. 17 that the gaps 6 are parallel to each other as well as gaps 6', which confers on element 1 different radial stiffnesses. The dissymmetry of the transverse stiffnesses can be further increased by conferring on the cross section of the element a shape which is not circular, as shown in the left-hand portion of the drawing, but an elliptic shape, as shown in the right-hand portion.

I claim:

1. A resilient material element which is intended to be subjected to compression forces in an axial direction, said resilient material element comprising,
    a central body having two opposite faces extending in a transverse direction substantially perpendicular to said axial direction and intended to be subjected to compression forces in the axial direction;
    base studs located on said two opposite faces and having a cross section less than that of the central body, taken in the transverse direction, and subjected to compression forces in the said axial direction;
    external studs superposed on said base studs for being subjected to a compression forces in the axial direction, said external studs having a substantially small cross-section, taken in the transverse direction, than said base studs, said resilient material element increasing in stiffness at a rate substantially greater than the increase of compression forces on said resilient material element when said compression forces exceed a given amount.

2. A resilient material element according to claim 1, wherein at least one of said external studs comprises a series of superposed studs, each successive external stud from the central body outward having a cross-section smaller than a previous external stud on which said successive external stud is superposed.

3. A resilient material element according to claim 1, wherein said gaps separate all of said base studs.

4. A resilient material element according to claim 1, wherein said resilient material element includes external walls having portions of reduced cross-section for cooperating with corresponding lateral bearing surfaces to cause a sudden increase in stiffness when said resilient material element is subjected to compression forces in excess of a second given amount in said axial direction.

5. A resilient material element according to claim 4, wherein said reduced portions comprise studs.

6. A resilient material element according to claim 4, wherein said reduced portions comprise grooves.

7. A resilient material element according to claim 1, wherein said resilient material element includes internal walls having portions of reduced cross-section for co-operation with corresponding lateral bearing surfaces to cause a sudden increase in transverse stiffness when said resilient material element is subjected to compression forces in excess of a second given amount in said axial direction.

8. A resilient material element according to claim 1, wherein said reduced portions comprise studs.

9. A resilient material element according to claim 7, wherein said reduced portions comprise grooves.

10. A resilient material element according to claim 1, wherein said resilient material element includes recesses, said recesses being reduced by the effect of said compression forces, said recesses including adjacent walls which cause a sudden increase in stiffness when said walls contact each other, said walls contacting each other when said compression forces exceed the amount which causes said base studs to become crushed.

11. A resilient material element according to claim 10, wherein said recesses comprise gaps separating at least some of said base studs.

12. A resilient material element according to claim 11, wherein said central body is cylindrical in shape and said gaps comprise radial gaps having constant angular spacing.

13. A resilient material element according to claim 11, wherein said gaps on at least one of the faces of said resilient material element are parallel to each other.

* * * * *